United States Patent [19]
Yoshida

[11] Patent Number: 5,521,730
[45] Date of Patent: May 28, 1996

[54] PHOTOCONDUCTIVE-TYPE LIQUID CRYSTAL LIGHT VALVE WITH A SHIELDING LAYER MADE OF MANGANESE OXIDE AND SILICON DIOXIDE

[76] Inventor: Kenzi Yoshida, c/o Corporate Research and Development Laboratory, Pioneer Electronic Corporation, 6-1-1, Fujimi, Tsurugashima-shi, Saitama 350-02, Japan

[21] Appl. No.: 258,104

[22] Filed: Jun. 10, 1994

[30] Foreign Application Priority Data

Jun. 16, 1993 [JP] Japan .................................. 5-144726

[51] Int. Cl.⁶ ............................................. G02F 1/135
[52] U.S. Cl. ...................................................... 359/72
[58] Field of Search ........................................ 359/72, 67

[56] References Cited

U.S. PATENT DOCUMENTS 4,673,660  6/1987  Thanh .................................. 501/135
4,799,773  1/1989  Sterling .............................. 359/72

Primary Examiner—Anita Pellman Gross
Assistant Examiner—James A. Dudek

[57] ABSTRACT

A photoconductive-type liquid crystal light valve having a shielding layer achieves a high resolution since shielding layer has both a high impedance and a high light-shielding property. The liquid crystal light valve comprises: a pair of transparent substrates disposed parallel to each other as a writing side and a reading side; a pair of transparent electrodes of a writing side and a reading side layered on inner side walls of the transparent substrates respectively to be face to face with each other; a photoconductive layer, a light shielding layer, a reflecting layer and a liquid crystal layer which are layered in sequence from the writing side to the reading side between the transparent electrodes, wherein the light shielding layer is made of a mixture of manganese oxide and silicon dioxide dispersed each other.

2 Claims, 7 Drawing Sheets

PHOTOCONDUCTIVE-TYPE LIQUID CRYSTAL LIGHT VALVE WITH A SHIELDING LAYER MADE OF MANGANESE OXIDE AND SILICON DIOXIDE

BACKGROUND OF THE INVENTION

1. Field of the Invention

The invention relates to a projection-type liquid crystal display apparatus including a photoconductive-type liquid crystal light valve ("PLCLV" hereinafter) for reflecting an incident light flux and providing an image to the reflected light flux and a projecting lens for projecting the reflected light flux.

2. Description of Prior Art

FIG. 1 shows the construction of a PLCLV 1. A liquid crystal layer 11 is defined by a spacer 12 and orientation layers 13 and 14. A photoconductive layer 15 on which an image is drawn is laminated on the writing side of the orientation layer 14 through a reflecting layer 16 and a light shielding layer 17. A transparent electrode 18 is arranged on the surface of the reading side of the orientation layer 13. A transparent electrode 19 is arranged on the surface of the writing side of the photoconductive layer 15. The liquid crystal layer 11, the reflecting layer 16, the light shielding layer 17, the photoconductive layer 15 and the like are sandwiched by a pair of glass substrates 20 and 21 with the transparent electrodes 18 and 19.

The reflecting layer 16 reflects a projection light which enters from the reading side on which the liquid crystal layer 11 is located. The light shielding layer 17 absorbs the leakage light of the projection light from the reflecting layer 16.

In case that an AC voltage is applied across the transparent electrodes 18 and 19 in the PLCLV 1, when a CRT draws an image onto the photoconductive layer 15 so that the write light flux enters from the right side (writing side) in FIG. 1, an internal resistance of the photoconductive layer 15 changes in a manner that it decreases locally in accordance with the light and shadow portions (change in amount of the received light) of the image. The AC voltage between the transparent electrodes 18 and 19, consequently, is applied to the inside of the adjacent liquid crystal layer 11 corresponding to the distribution of the changed internal resistance of the photoconductive layer 15. As a consequence, birefringence occurs due to spatial modulation of liquid crystal molecules in the liquid crystal layer in accordance with the potential distribution of the photoconductive layer 15, so that a light and shade pattern of a projection image to be projected to a screen is formed in the liquid crystal layer 11.

It is required that the black thin film of the light shielding layer 17 has both a shielding property preventing the leakage of a high power projection light flux emitted by a light source from passing and entering the photoconductive layer 15, and a resistance property with a high impedance absolute value to suppress an unwanted expansion of the potential distribution and maintain a resolution. However, it is difficult that these shielding and resistance characteristics are satisfied by only one single light shielding layer.

OBJECT AND SUMMARY OF THE INVENTION

An object of the present invention is to provide a PLCLV having a shielding layer having both a high impedance and a high light-shielding property.

A PLCLV according to the present invention comprises:

a pair of transparent substrates disposed parallel to each other as a writing side and a reading side;

a pair of transparent electrodes of a writing side and a reading side layered on inner side walls of said transparent substrates respectively to be face to face with each other;

a photoconductive layer, a light shielding layer, a reflecting layer and a liquid crystal layer which are layered in sequence from the writing side to the reading side between said transparent electrodes, wherein said light shielding layer is made of a mixture of manganese oxide and silicon dioxide dispersed each other.

According to the present invention, there is provided a PLCLV achieving a high resolution because of its light shielding layer having a high shielding property and a high impedance,

DESCRIPTION OF THE PREFERRED EMBODIMENT

A preferred embodiment according to the present invention will be described below referring to the accompanying drawings.

Figure 2:
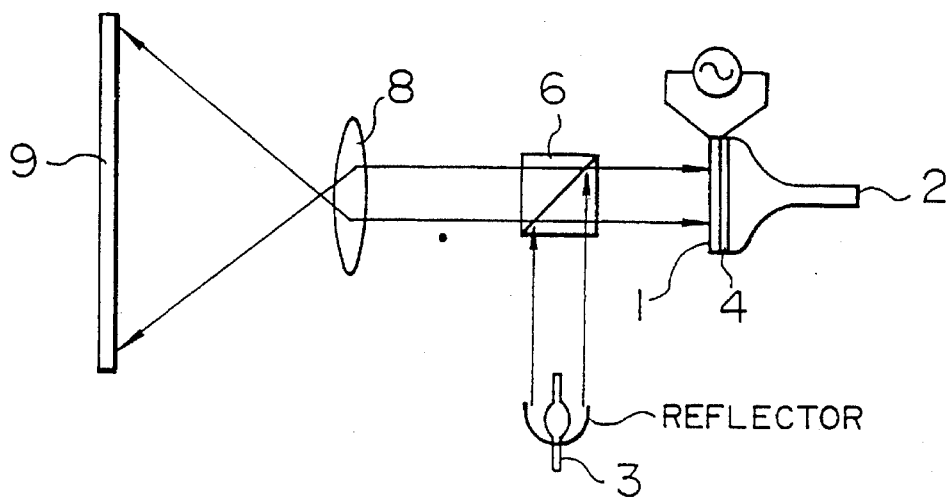
FIG. 2 is a schematic diagram of a projection-type liquid crystal display apparatus of the reflection type using a PLCLV.

FIG. 2 shows an example of the structure of a liquid crystal display apparatus using such a PLCLV of a reflection type. In the figure, the PLCLV 1 is coupled to the front face of a CRT (cathode ray tube) 2. The CRT 2 is arranged to write an image displayed on the front face into a photoconductive layer of the PLCLV through an optical fiber layer 4. A light flux is generated from a light source 3 such as a metal halide lamp and enters and passes a polarization beam splitter 6. P-polarized components in the incident light passes through the beam splitter 6 the direction of most of the S-polarized components is bent by the polarization beam splitter 6 and most of the S-polarized components enter the PLCLV 1.

Now, assuming that the birefringence corresponding to the image on the CRT occurs in the liquid crystal layer of the PLCLV 1, the S-polarized components in the reflection light reflected in the PLCLV 1 are converted into the P-polarized components in accordance with a double refractive index of the liquid crystal layer. Since the P-polarized components in the reflected light directly passes through the polarization beam splitter 6, the image carried by the P-polarized components, i.e., the projection light is projected onto a screen 9 through a projection lens 8.

Figure 1:
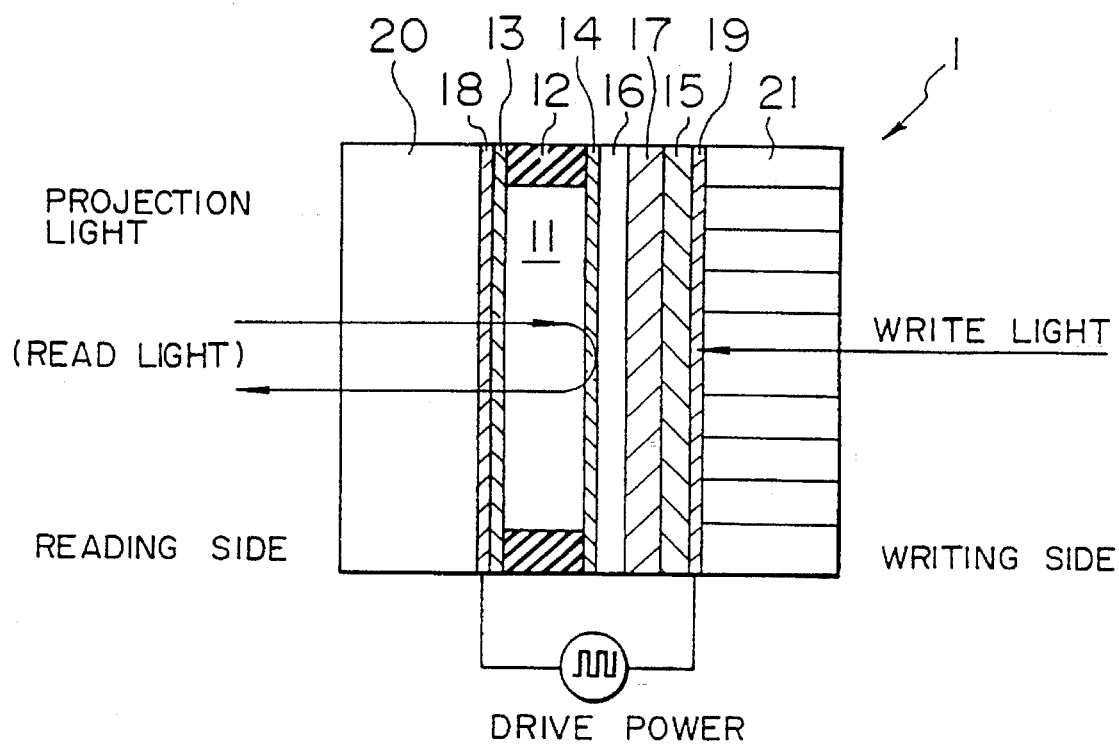
FIG. 1 is a partially enlarged schematic cross-sectional view of the PLCLV.
Figure 3:
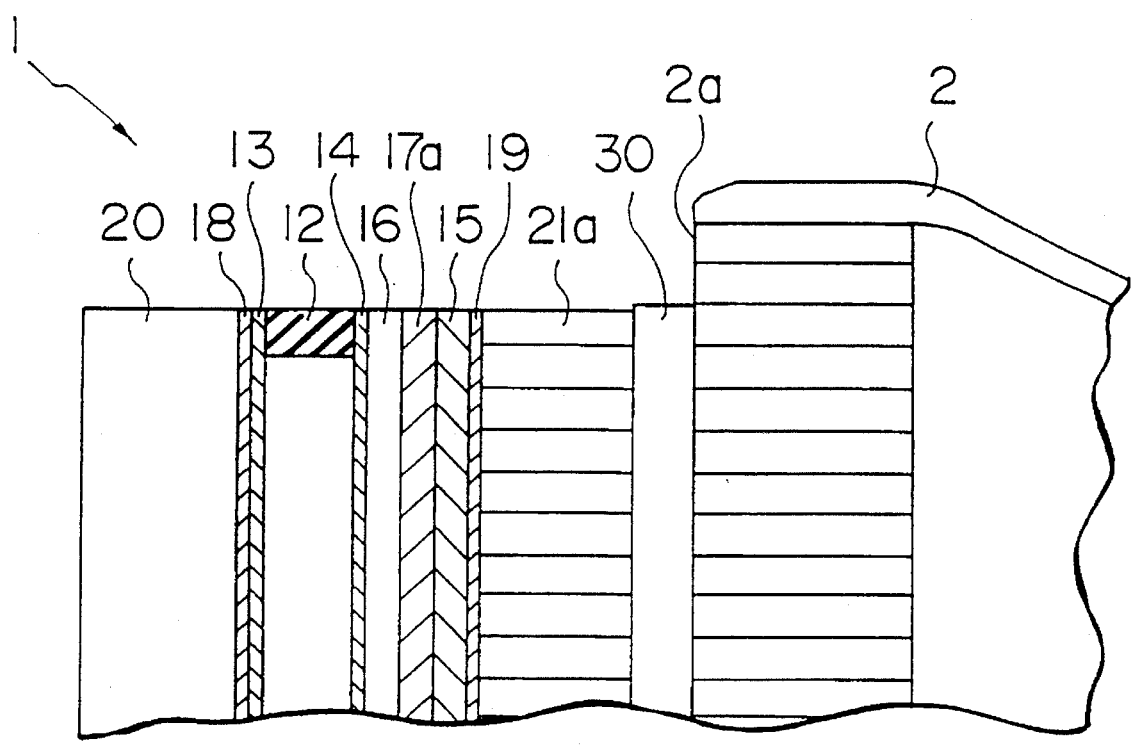
FIG. 3 is a partially enlarged schematic cross-sectional view of a PLCLV according to the present invention.

FIG. 3 shows an enlarged view of such an embodiment of the PLCLV 1. This PLCLV is constructed similar to the device shown in FIG. 1 excepting for a light shielding layer 17a and a glass substrate 21a. The light shielding layer 17a is made of a mixture of manganese oxide and silicon dioxide dispersed each other as a black light shielding layer. Further, the glass substrate 21a on the writing side is made from a fiber optical plate each fiber extending perpendicular to the surface of the substrate. In addition, the CRT 2 has also a front face made from a fiber optical plate substrate 2a. The PLCLV 11 and the CRT fiber optical plate 2a are connected via a connecting layer 30 made of silicon gel, glycerin or the like.

A liquid crystal layer 11 is formed in a manner that a gap between the orientation layers is filled with a liquid crystal material. A reflecting layer 16 is made of a dielectric material. A photoconductive layer 15 is made of amorphous silicon hydride (a-Si:H). Transparent electrodes 18 and 19 are made of indium tin oxide or tin dioxide.

In the light shielding layer 17a of black thin film, manganese oxide and silicon dioxide are dispersed each other to form a mixture state thereof. This light shielding layer has the following characteristics and conditions (1)–(4):

(1) The process temperature in the film-forming of the shielding layer is lowered e.g., ambient temperature, and then it is preferable to stably maintain a property of photoconductive layer 15 made of hydrogenated amorphous silicon (a-Si:H) previously formed on the writing side substrate 21;

(2) The flatness of the shielding layer is excellent to effectively reflect light as a mirror surface because the reflecting layer is formed on the shielding layer;

(3) The light absorption coefficient is high, for example, the shielding layer with film-thickness 2 micrometer reduces an intensity of the incident light with wavelength 500 nm to 1/5000 or less, that is, the light absorption coefficient alpha is $4.5 \times 10^4$ cm$^{-1}$ for 500 nm wavelength light; and (4) The impedance absolute value $|Z|$ is high for maintaining a high resolution.

Now, for the purpose that a high-vision image of the high definition television is obtained on the 100 inch projection screen by using a PLCLV comprising a liquid crystal layer having a picture face sized in 1–2 inches, the limit of resolution of 50 line-pair /mm or more is necessary. To obtain such a high resolution, the light shielding layer 17a requires the impedance absolute value $|Z|=1\times10^7$ ohm-centimeter or more, since there are the impedance absolute values of the liquid crystal layer 11 $|Z|=5\times10^7$ ohm-centimeter and the dielectric mirror 16 $|Z|=1.6\times10^7$ ohm-centimeter (f=10 KHz).

The light shielding layer satisfying the conditions and characteristics above mentioned is a film in which MnOx (x=1, 1/2, 4/3, 3/2, or 2) and SiO$_2$ are mixed and dispersed. Namely, MnOx improves the light absorption coefficient, and SiO$_2$ improves the impedance absolute value, these materials are therefore employed preferably. The characteristics of MnOx and SiO$_2$ are shown in the following TABLE 1.

TABLE 1

|  | alpha (cm$^{-1}$) for light of wavelength 500 nm | $|Z|$ (ohm-centimeter) for applied frequency f = 10 KHz |
|---|---|---|
| SiO$_2$ | ~0 | $3.5 \times 10^7$ |
| MnOx | $3.0 \times 10^5$ | $3.5 \times 10^5$ |

A method for forming the light shielding layer 17a may be selected from, for example, a RF or DC spattering method and an electron beam vapor deposition. MnOx and SiO$_2$ of materials for a dispersion film are alternatively deposited in time-shearing on a substrate to isotopically form a thin film. The duty ratio of the film-thickness is suitably selected. These film-forming method are preferable to maintain the substrate at a low temperature and improve a mirror surface property. In this embodiment, the RF magnetron spattering method was used for the film-forming of the light shielding layer 17a.

Figure 4:
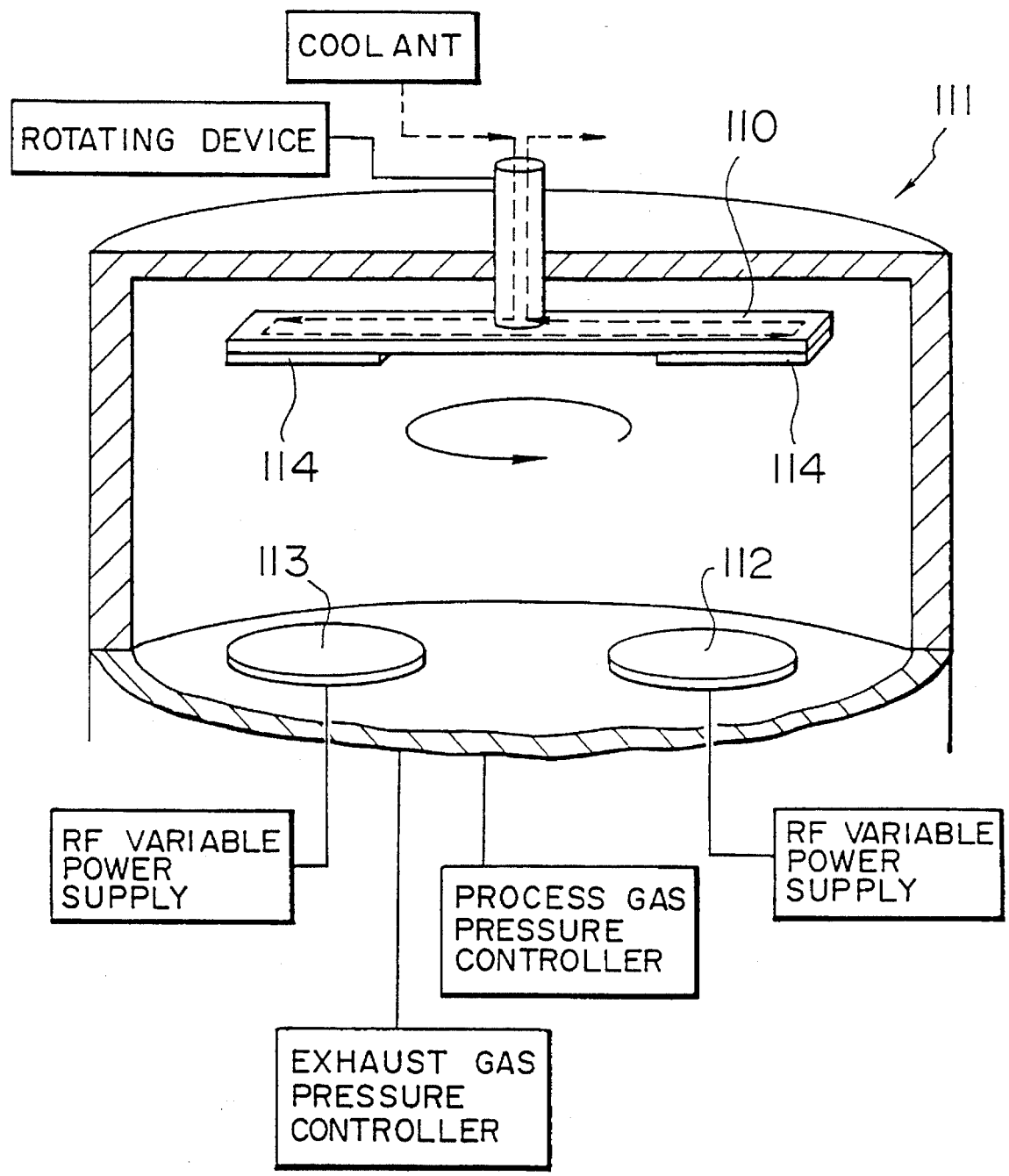
FIG. 4 is a partially cut schematic diagram showing a device for forming a light shielding layer of the present invention.

FIG. 4 shows a device for forming a light shielding layer comprising a vacuum chamber 111, a rotating holder 110 disposed at the inner upper portion of the chamber, and MnOx and SiO$_2$ targets 112 and 113 disposed at the inner bottom portion of the chamber. The gas pressure of the inside of the vacuum chamber 111 is controlled by a process gas pressure controller and an exhaust gas pressure controller. The substrate holder is driven by a device for rotating the axis thereof and circulated with a coolant e.g., water. Target folder carrying MnOx and SiO$_2$ targets are connected to separate RF variable power supplies to be controlled respectively. As shown in the figure, since the substrate holder 110 carrying the substrates 114 at the opposite ends rotates at the ceiling of the vacuum chamber 111, MnOx and SiO$_2$ targets 112 and 113 are positioned along the circle trace of the substrates 114 on the bottom of the chamber. By the rotation of the substrate holder, MnOx and SiO$_2$ are alternately deposited on the photoconductive layer of a-Si:H previously formed on the substrates attached to the holders. The amounts of MnOx and SiO$_2$ per one cycle in the film-forming process may be determined in accordance with both the RF power applied to the targets and the rotation speed of the substrate holder. In addition, this substrate is water-cooled for keeping an ambient temperature.

In case these two materials are alternately film-formed on the photoconductive layer, when the amounts of thickness deposited per one cycle exceed to 10 angstroms or more respectively, the shielding layer becomes a multiple layer with an anisotropic property. On the other hand, when the amounts of thickness deposited per one cycle are controlled at 10 angstroms or less, the shielding layer becomes a dispersion film with an isotropic property without any anisotropic. The latter is preferable.

After that the MnOx–SiO$_2$ dispersion film 17a (light shielding layer) is formed as mentioned above, a dielectric mirror 16 and an orientation thin film required for the LCD are deposited in sequence on the MnOx–SiO$_2$ dispersion film. This substrate is assembled with the other substrate carrying an orientation layer to be face to face, so that a gap between the orientation layers is filled with a liquid crystal material. In this way, the PLCLV as shown in FIG. 3 is obtained.

The characteristics of the MnOx–SiO$_2$ dispersion layer were measured to research optimized values of materials for a shielding layer.

Figure 5:
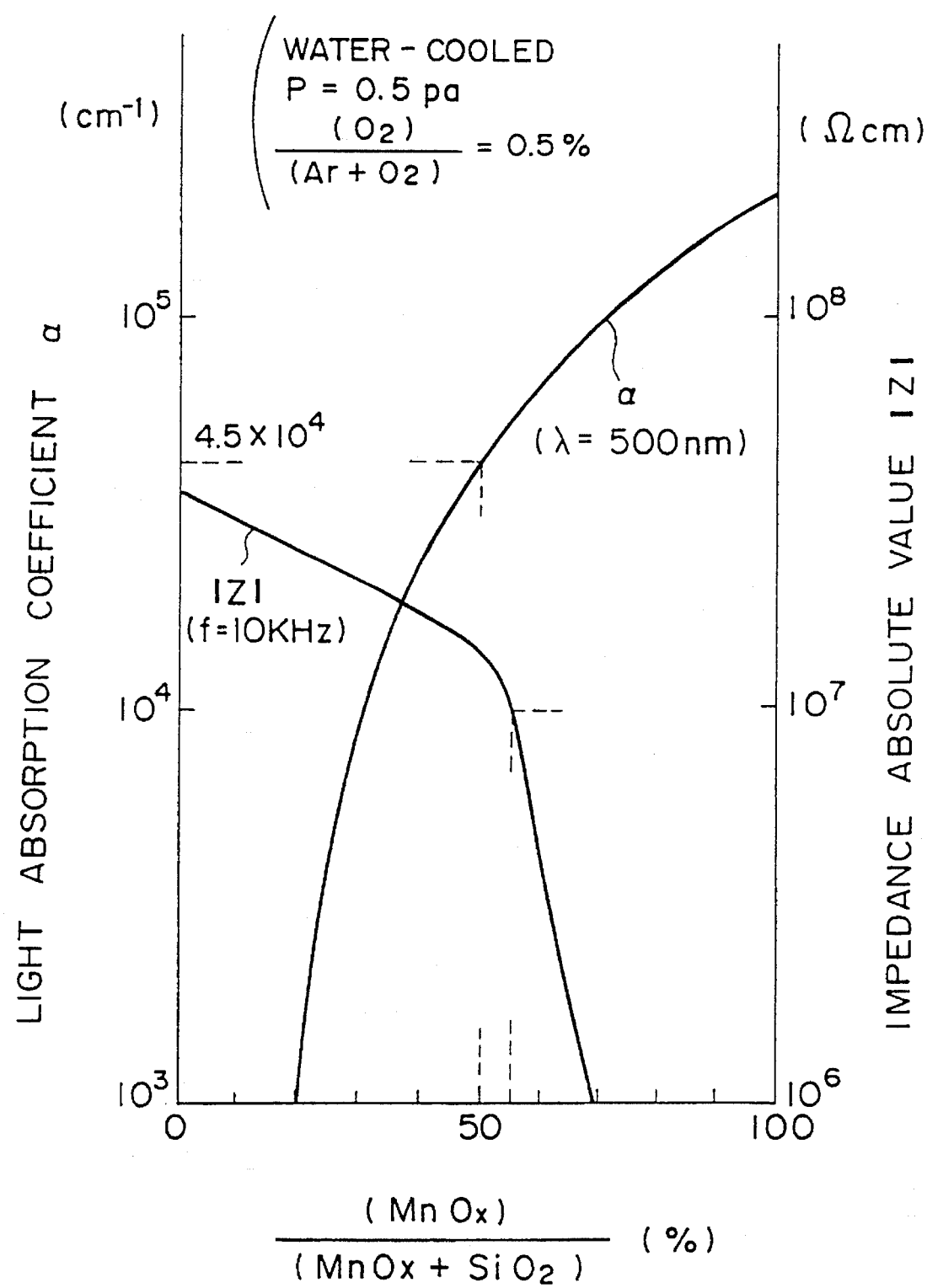
FIG. 5 is a graph showing a relationship between a light absorption coefficient and an impedance absolute value |z| with respect to a MnOx concentration in a light shielding layer made of dispersed $MnOx–SiO_2$ during a film-forming thereof.

First, influence of change of MnOx ratio was tested during the film-forming of a dispersed MnOx–SiO$_2$ film in which the conditions were atmospheric gas pressure P=0.5 pa, substrate being cooled by water coolant, and (O$_2$)/(Ar+O$_2$)= 0.5%. FIG. 5 shows the results of the characteristics of the relationship between a light absorption coefficient and an impedance absolute value $|z|$ with respect to MnOx concentration ratios. The higher the ratio (MnOx)/(MnOx+SiO$_2$) increases, the higher the light absorption coefficient alpha increases, but the lower the impedance absolute value $|Z|$ decreases. As seen from FIG. 5 of graph, the ratio range of (MnOx)/(MnOx+SiO$_2$)=50–55% is preferably suffices the conditions of the necessary light absorption coefficient alpha and the necessary impedance absolute value $|Z|$. In other word, the weight ratio of manganese oxide and silicon dioxide in the light shielding layer is within the range 4.5:5.5–5.5:4.5 which is preferable for the mixed dispersion state thereof.

Figure 6:
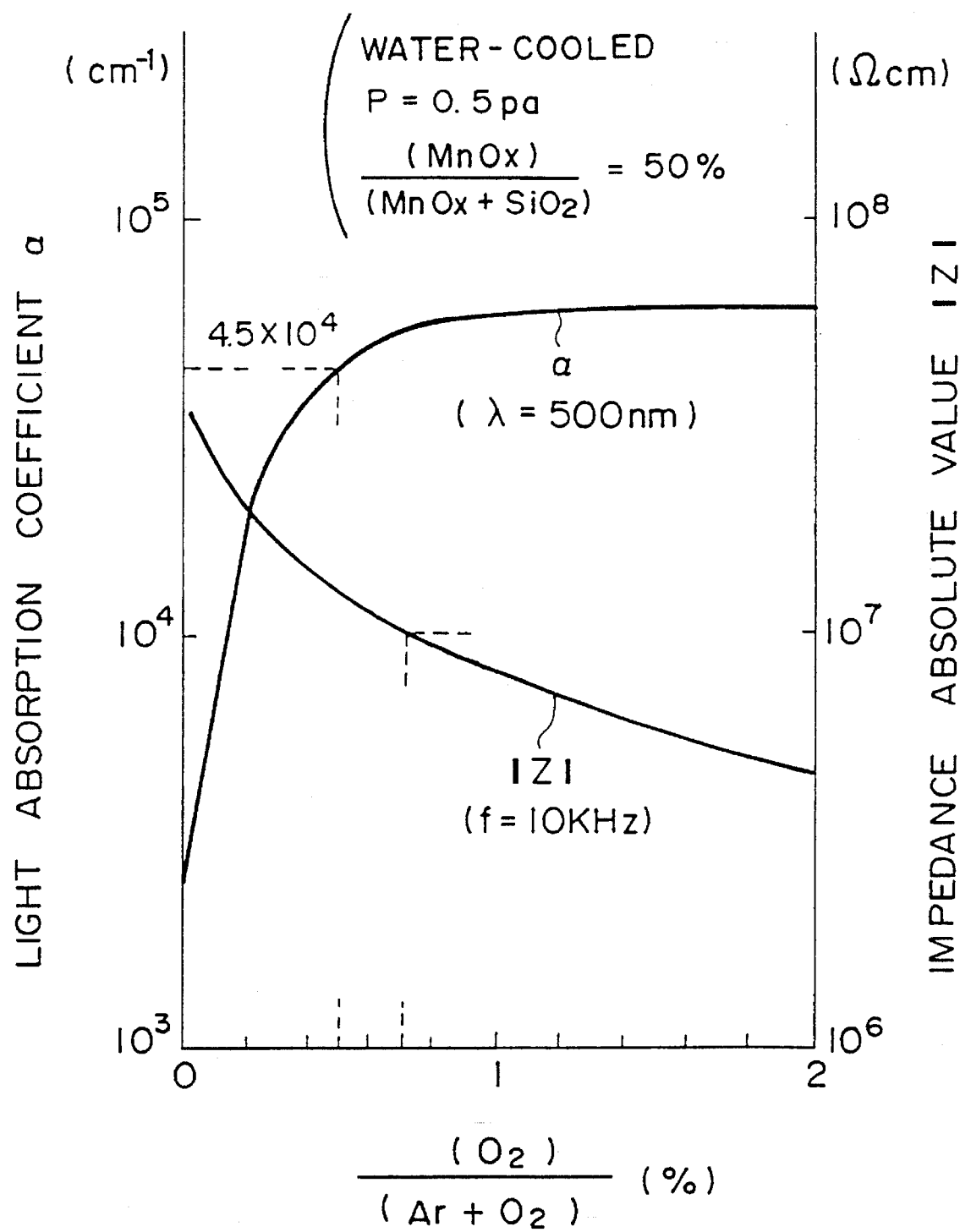
FIG. 6 is a graph showing a relationship between a light absorption coefficient and an impedance absolute value |z| with respect to an $O_2$ concentration in a atmospheric gas $Ar$—$O_2$ (Argon and oxygen gas) during a film-forming of a light shielding layer.

Next, influence of change of the O$_2$ ratio in Ar and O$_2$ gases was tested during the film-forming of a dispersed MnOx–SiO$_2$ film in which the conditions were P=0.5 pa, substrate being cooled by water coolant, and (MnOx)/(MnOx+SiO$_2$)=50%. FIG. 6 shows a result of a relationship between a light absorption coefficient and an impedance absolute value $|z|$ with respect to an O$_2$ concentration in an atmospheric gas Ar—O$_2$ during a film-forming of the light shielding layer. When the oxygen-ratio (O$_2$)/(Ar+O$_2$) increases, the ratio (MnO$_2$)/(Mn$_2$O$_3$) increases in MnOx (when O$_2$ is 0% then Mn$_2$O$_3$ is 100%), and the light absorption coefficient alpha increases, and the impedance absolute value $|Z|$ decreases. It is understood from the graph of FIG. 6 that the ratio range (O$_2$)/(Ar+O$_2$)=0.5–0.7% suffices the necessary light absorption coefficient alpha and the impedance absolute value $|Z|$.

On the basis of the results mentioned above, a light shielding layer for a PLCLV was film-formed in the conditions of (MnOx)/(MnOx+SiO$_2$)=50%, and (O$_2$)/(Ar+O$_2$)=0.5%. The obtained light shielding layer had characteristics that the absorption coefficient alpha was 4.5×10$^4$ cm$^{-1}$ under the irradiation of light of wavelength 500 nm, and the impedance absolute value $|Z|$ was 1.4×10$^7$ ohm-centimeter upon applying of 10 KHz frequency electric power. As a result, the PLCLV using this light shielding layer had the limit of resolution of 50 line-pair /mm or more, since an intensity of irradiated light with wavelength of 500 nm was reduced to 1/8000by such an obtained light shielding layer.

Figure 7:
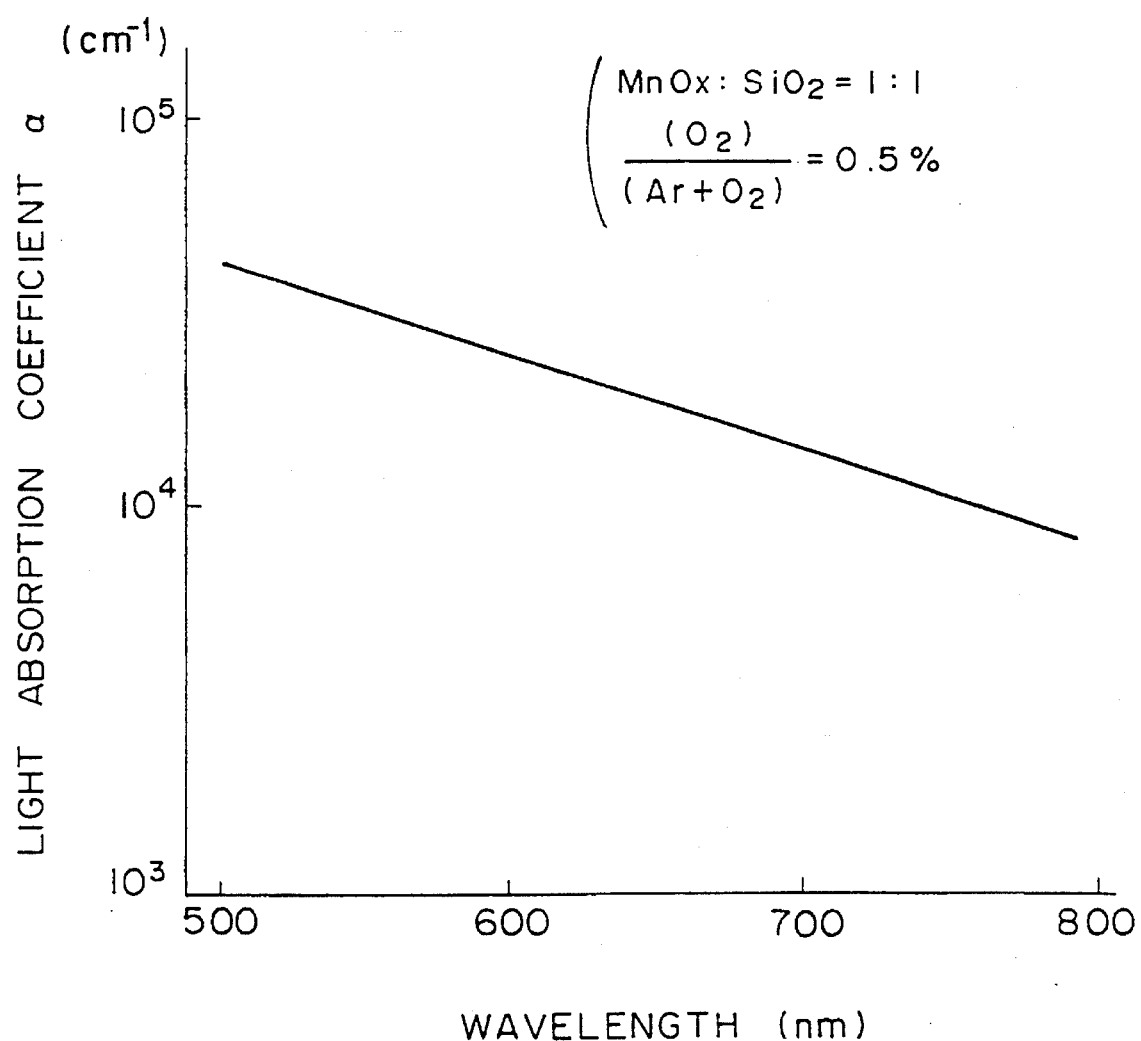
FIG. 7 is a graph showing a characteristics of light absorption coefficient of an embodiment with respect to a wavelength of light irradiated to a light shielding layer.
Figure 8:
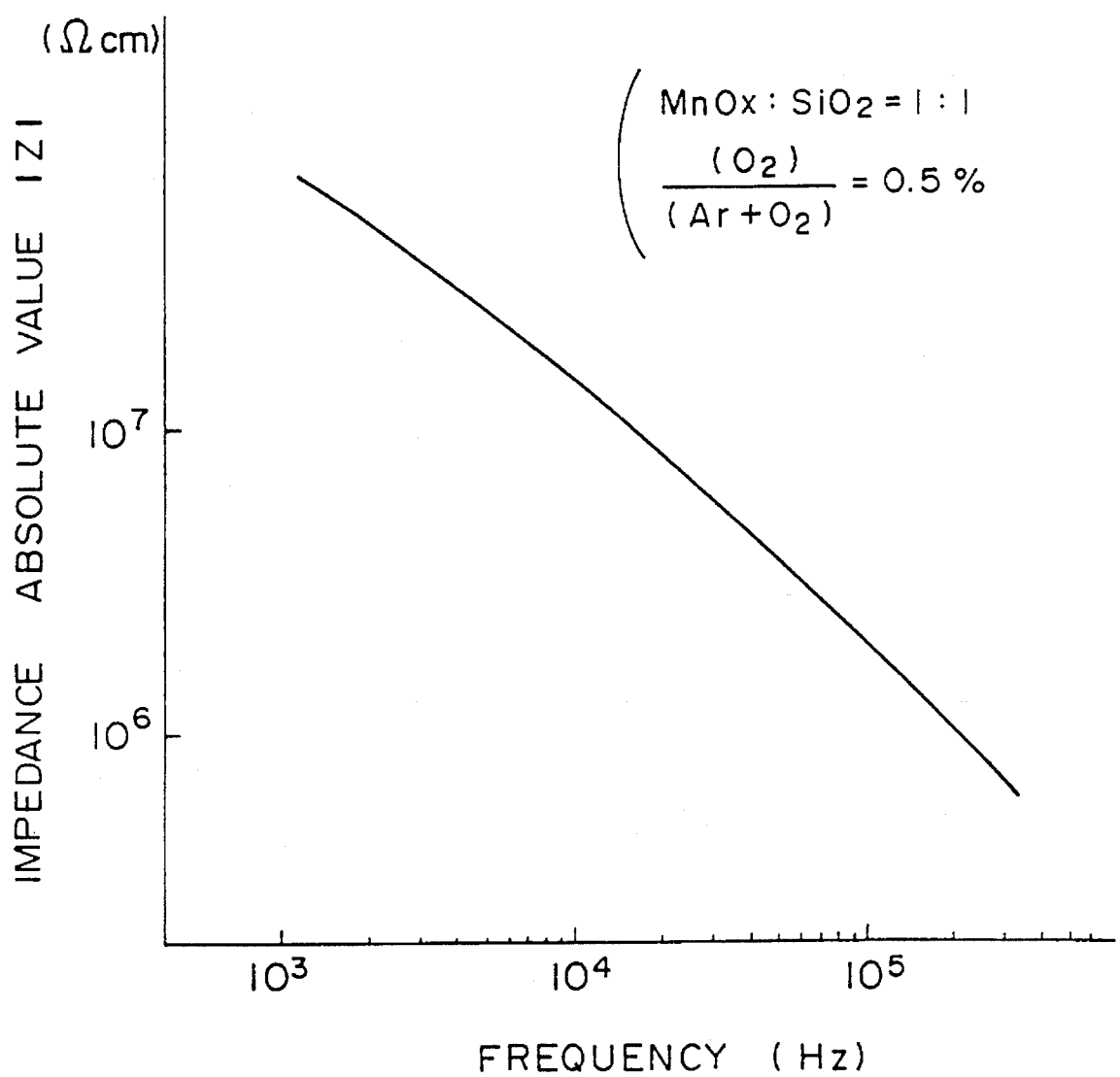
FIG. 8 is a graph showing a characteristic of impedance absolute value |z| of an embodiment with respect to a frequency of a driving power supply applying a voltage to a light shielding layer.

With respect to the embodiment of MnOx–SiO$_2$ dispersion film in the conditions of (MnOx)/(MnOx+SiO$_2$)=50% or MnOx:SiO$_2$=1:1, and (O$_2$)/(Ar+O$_2$)=0.5%, FIG. 7 shows a relationship between the light absorption coefficient and a wavelength of light irradiated to the light shielding layer, and FIG. 8 shows a relationship between the impedance absolute value $|z|$ and the frequency of a driving power applied to the light shielding layer.

According to the present invention, since the PLCLV using the light shielding layer of the MnOx and SiO$_2$ mixed dispersion film has a high light absorption coefficient or a sufficient blackness, for example, 4–5×10$^4$ cm$^{-1}$ (at 500 nm wavelength light), and 2.5–3×10$^4$ cm$^{-1}$ (at 600 nm wavelength light), furthermore, has a high impedance absolute value or a sufficient insulating property, e.g., 1×10$^7$ ohm-centimeter or more (at 10 KHz frequency in the application), the PLCLV achieves a high resolution limit. In addition, the PLCLV of the present invention has an excellent durability because this black light shielding layer has the loss angle of 80 degree (at 10 KHz frequency) which is very adjacent to that of dielectric material and no-problem in temperature characteristics. In the manufacturing process of the PLCLV using the light shielding layer of the present invention, Mn$_2$O$_3$ and SiO$_2$ are readily available with a low cost in the market, therefore, the PLCLV is economized in the natural resources. In addition, the mixed layer of MnOx and SiO$_2$ has a high affinity to both the photoconductive layer and the dielectric reflecting layer to enhance the adhering property.

What is claimed is:

1. A photoconductive-type liquid crystal light valve comprising:

a pair of transparent substrates disposed parallel to each other as a writing side and a reading side;

a pair of transparent electrodes of a writing side and a reading side layered on inner side walls of said transparent substrates respectively to be face to face with each other;

a photoconductive layer, a light shielding layer, a reflecting layer and a liquid crystal layer which are layered in sequence from the writing side to the reading side between said transparent electrodes, wherein said light shielding layer is made of a mixture of manganese oxide and silicon dioxide dispersed each other.

2. A photoconductive-type liquid crystal light valve claimed in claim 1, wherein the components of said mixture is mixed and dispersed with a weight ratio of manganese oxide and silicon dioxide within a range 4.5:5.5–5.5:4.5.

\* \* \* \* \*